US012712779B2

(12) United States Patent
Savalle et al.

(10) Patent No.: US 12,712,779 B2
(45) Date of Patent: Aug. 18, 2026

(54) GRAPH-BASED RETRIEVAL AUGMENTED GENERATION OF SDK SCHEMAS FOR A LANGUAGE MODEL-BASED NETWORK TROUBLESHOOTING AGENT

(71) Applicant: Cisco Technology, Inc., San Jose, CA (US)

(72) Inventors: Pierre-André Savalle, Rueil-Malmaison (FR); Grégory Mermoud, Venthône (CH); Eduard Schornig, Haarlem (NL); Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 31 days.

(21) Appl. No.: 18/594,184

(22) Filed: Mar. 4, 2024

(65) Prior Publication Data

US 2025/0279929 A1 Sep. 4, 2025

(51) Int. Cl.
*H04L 41/0686* (2022.01)
*G06F 40/40* (2020.01)

(52) U.S. Cl.
CPC .......... *H04L 41/0686* (2013.01); *G06F 40/40* (2020.01)

(58) Field of Classification Search
CPC ............................. H04L 41/0686; G06F 40/40
See application file for complete search history.

(56) References Cited

U.S. PATENT DOCUMENTS

| | | | |
|---|---|---|---|
| 11,954,102 B1 * | 4/2024 | Palaniappan ....... G06F 16/2237 |
| 2018/0033017 A1 * | 2/2018 | Gopalakrishnan Iyer .................. G06N 5/043 |
| 2020/0192727 A1 | 6/2020 | Savenkov et al. |
| 2021/0383205 A1 | 12/2021 | Shang et al. |
| 2023/0252233 A1 | 8/2023 | Gutierrez et al. |
| 2024/0256429 A1 * | 8/2024 | Lucioni ............... G06F 11/3608 |
| 2025/0036939 A1 * | 1/2025 | Garapati .................. G06N 3/08 |
| 2025/0117727 A1 * | 4/2025 | Osborne .......... G06Q 10/06316 |

OTHER PUBLICATIONS

Mani et al., Enhancing Network Management Using Code Generated by Large Language Models, Aug. 11, 2023,pp. 1-8. Retrieved from <https://arxiv.org/pdf/2308.06261> (Year: 2023).*

Bairi R., et al., "CodePlan: Repository-level Coding using LLMs and Planning", arXiv:2309.12499v1 [cs.SE], Sep. 21, 2023, pp. 1-34.

(Continued)

*Primary Examiner* — Gil H. Lee
*Assistant Examiner* — Juan C Turriate Gastulo
(74) *Attorney, Agent, or Firm* — Merchant & Gould P.C.; Kenneth J. Heywood

(57) ABSTRACT

In one implementation, a device maintains a graph in which nodes of the graph represent entities in a computer network and edges of the graph represent relations between those entities. The device performs a search of the graph based on a query for input to a language model-based troubleshooting agent for the computer network. The device generates, based on the search, a schema in a particular programming language to answer the query. The device provides the schema to the language model-based troubleshooting agent to generate an answer to the query.

20 Claims, 14 Drawing Sheets

(56) References Cited

OTHER PUBLICATIONS

Lily: “Spider 1.0 Yale Semantic Parsing and Text-to-SQL Challenge”, retrieved from https://yale-lily.github.io/spider on Mar. 4, 2024, 21 Pages.
Mani S.K., et al., “Enhancing Network Management Using Code Generated by Large Language Models”, arXiv:2308.06261v1 [cs. NI], Aug. 11, 2023, pp. 1-8.
Nebulagraph: “Open Source, Distributed, Scalable, Lightning Fast”, retrieved from https://www.nebula-graph.io/ on Mar. 4, 2024, 10 Pages.

* cited by examiner

GRAPH-BASED RETRIEVAL AUGMENTED GENERATION OF SDK SCHEMAS FOR A LANGUAGE MODEL-BASED NETWORK TROUBLESHOOTING AGENT

TECHNICAL FIELD

The present disclosure relates generally to graph-based retrieval augmented generation of software development kit (SDK) schemas for a language model-based network troubleshooting agent.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

Implementing a network troubleshooting agent that uses an LLM to perform its tasks, though, remains challenging. Indeed, APIs from network controllers may return a large quantity of data that needs to be processed to answer the question. Very rarely will there be an API that directly provides the answer to a user's question. Instead, answering analytical and troubleshooting questions will require combining results from multiple API calls. In simple cases, processing may amount to simple filtering. In more complex cases, processing can require joining the results from multiple API calls, doing aggregation, running statistical procedures on the data (e.g., correlating multiple signals), etc. This cannot be carried out using static tools and requires providing the LLM information about the relevant software development kits (SDKs) to make the correct API calls and formulate an answer to the user's question.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
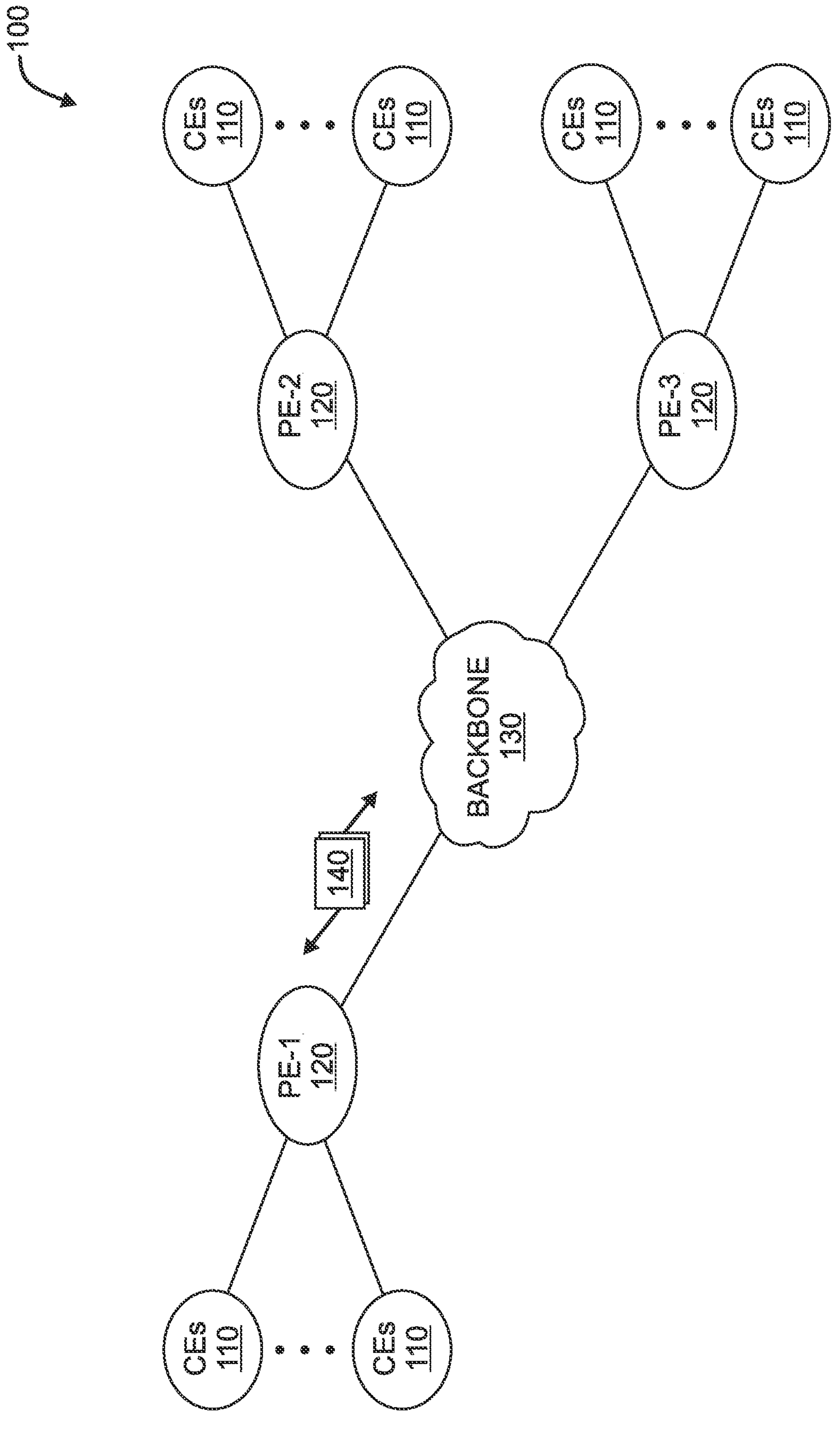
FIGS. 1A-1B illustrate an example communication network.

According to one or more implementations of the disclosure, a device maintains a graph in which nodes of the graph represent entities in a computer network and edges of the graph represent relations between those entities. The device performs a search of the graph based on a query for input to a language model-based troubleshooting agent for the computer network. The device generates, based on the search, a schema in a particular programming language to answer the query. The device provides the schema to the language model-based troubleshooting agent to generate an answer to the query.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
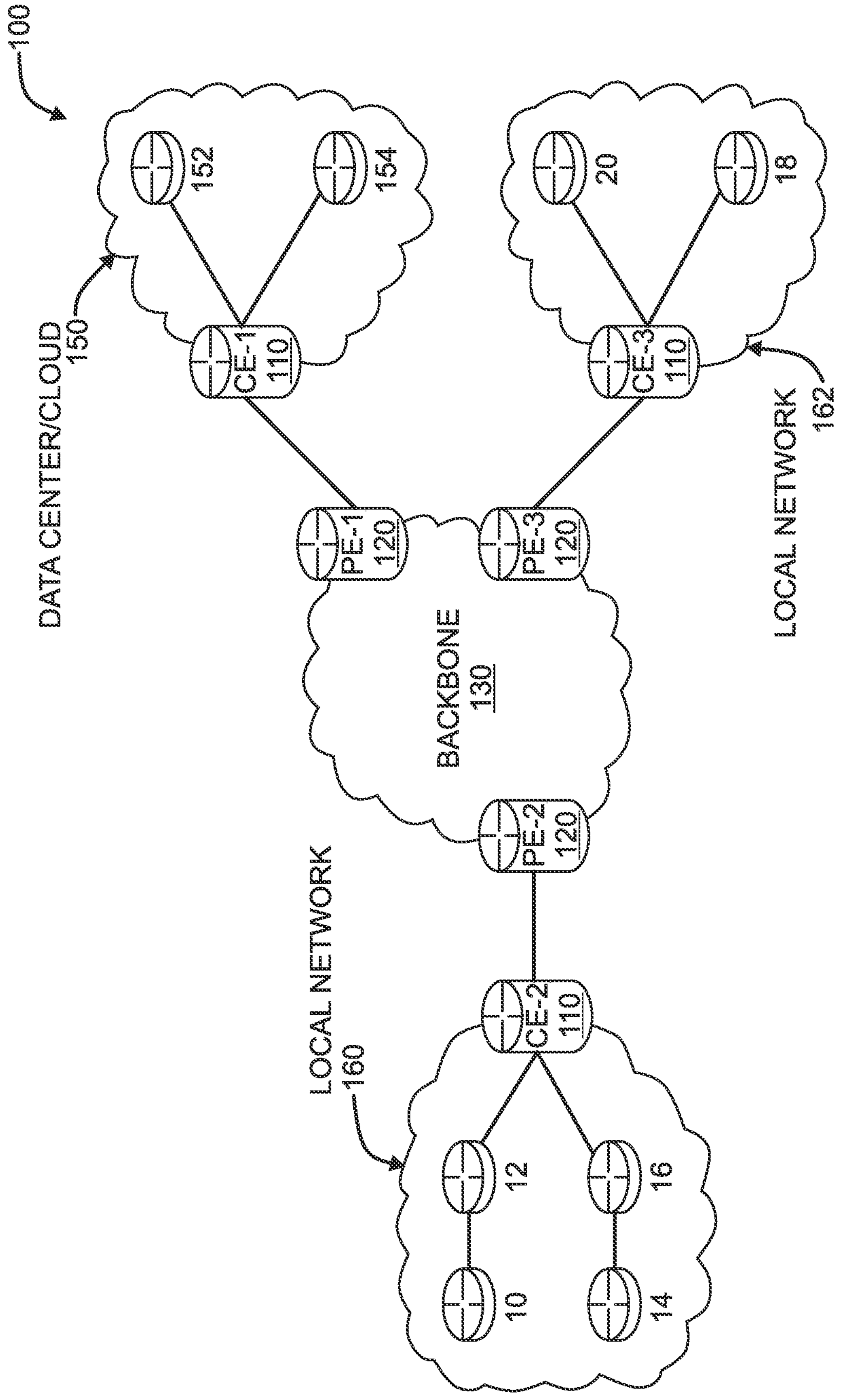

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
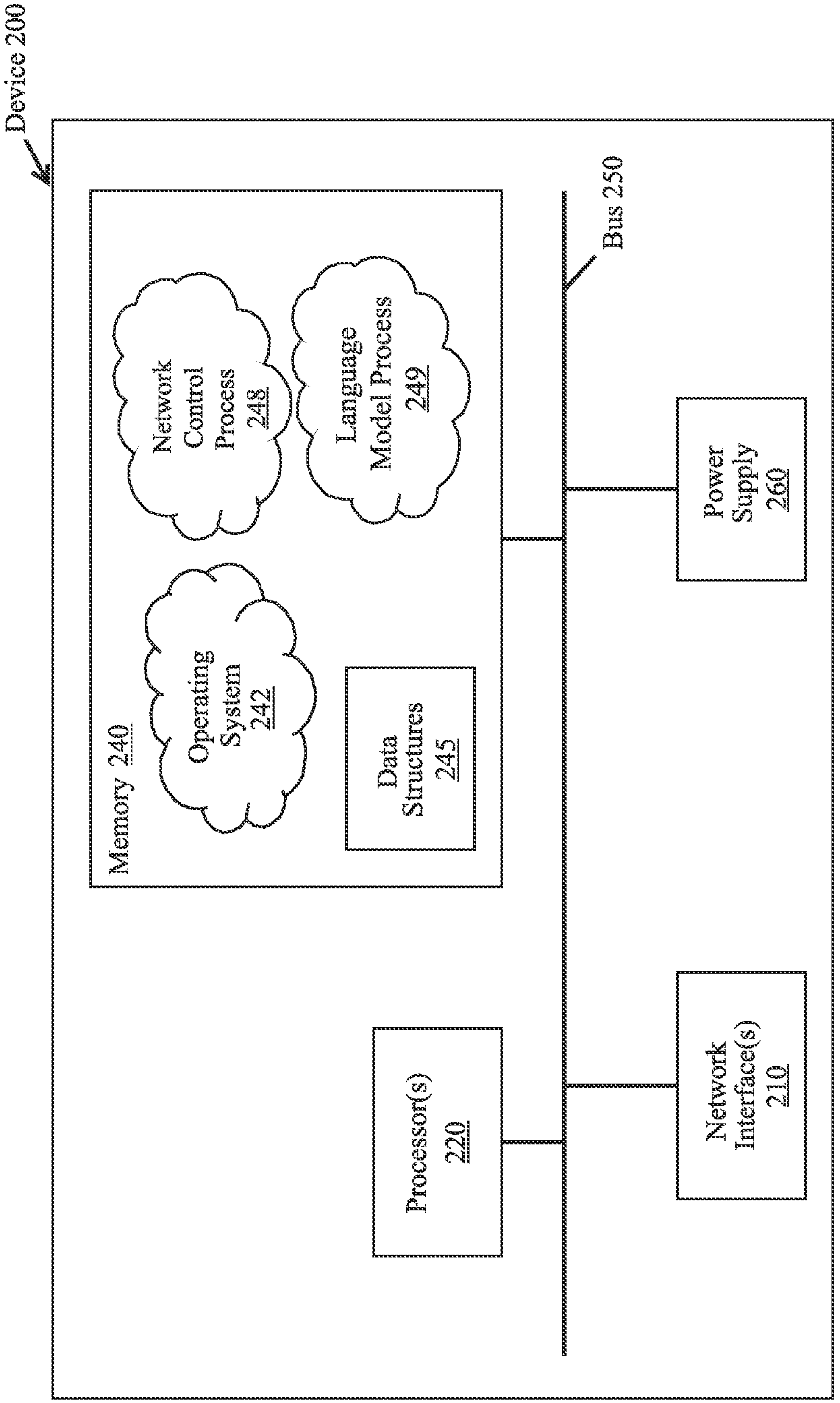
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
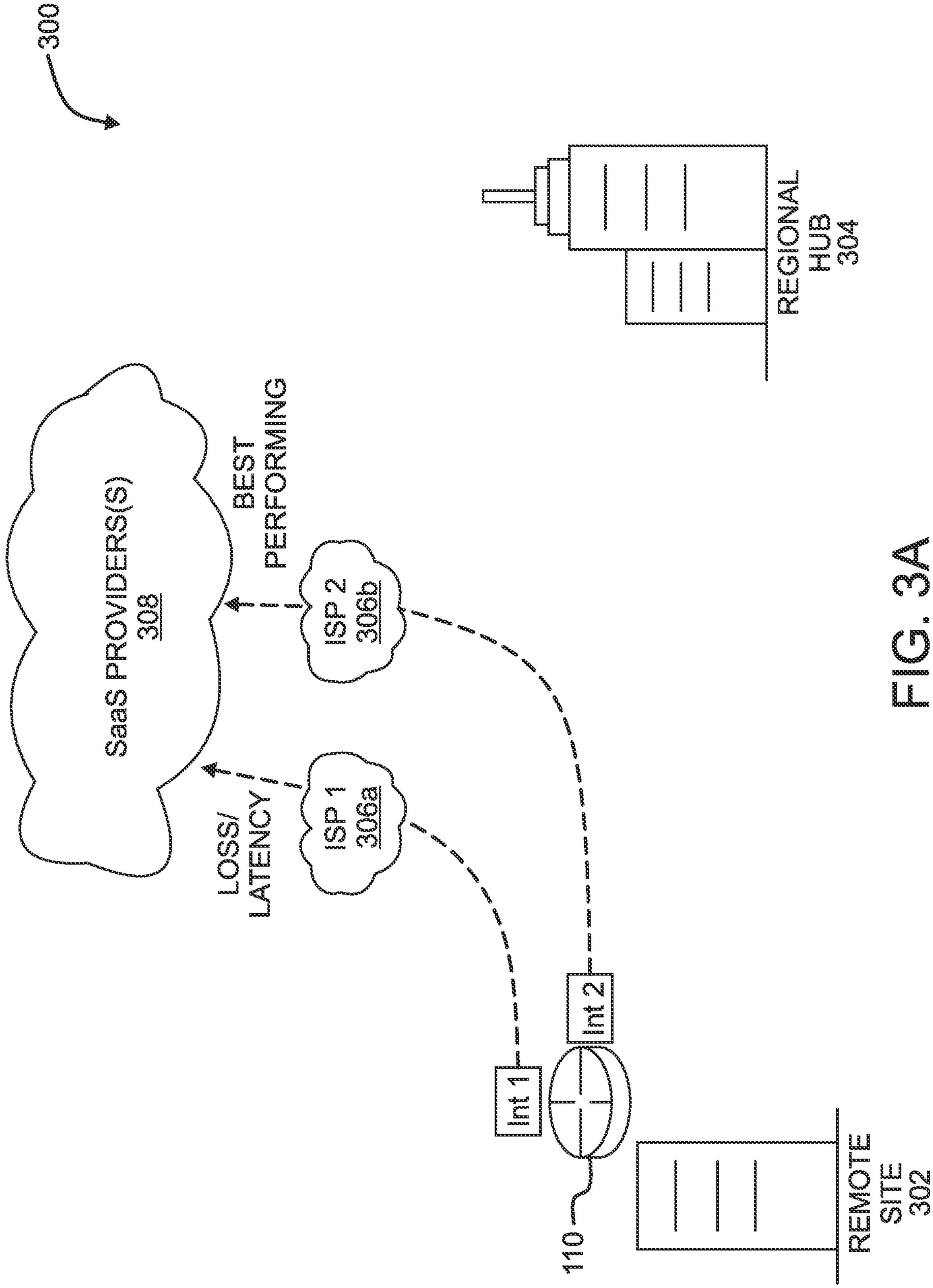
FIGS. 3A-3B illustrate example network deployments.
Figure 3B:
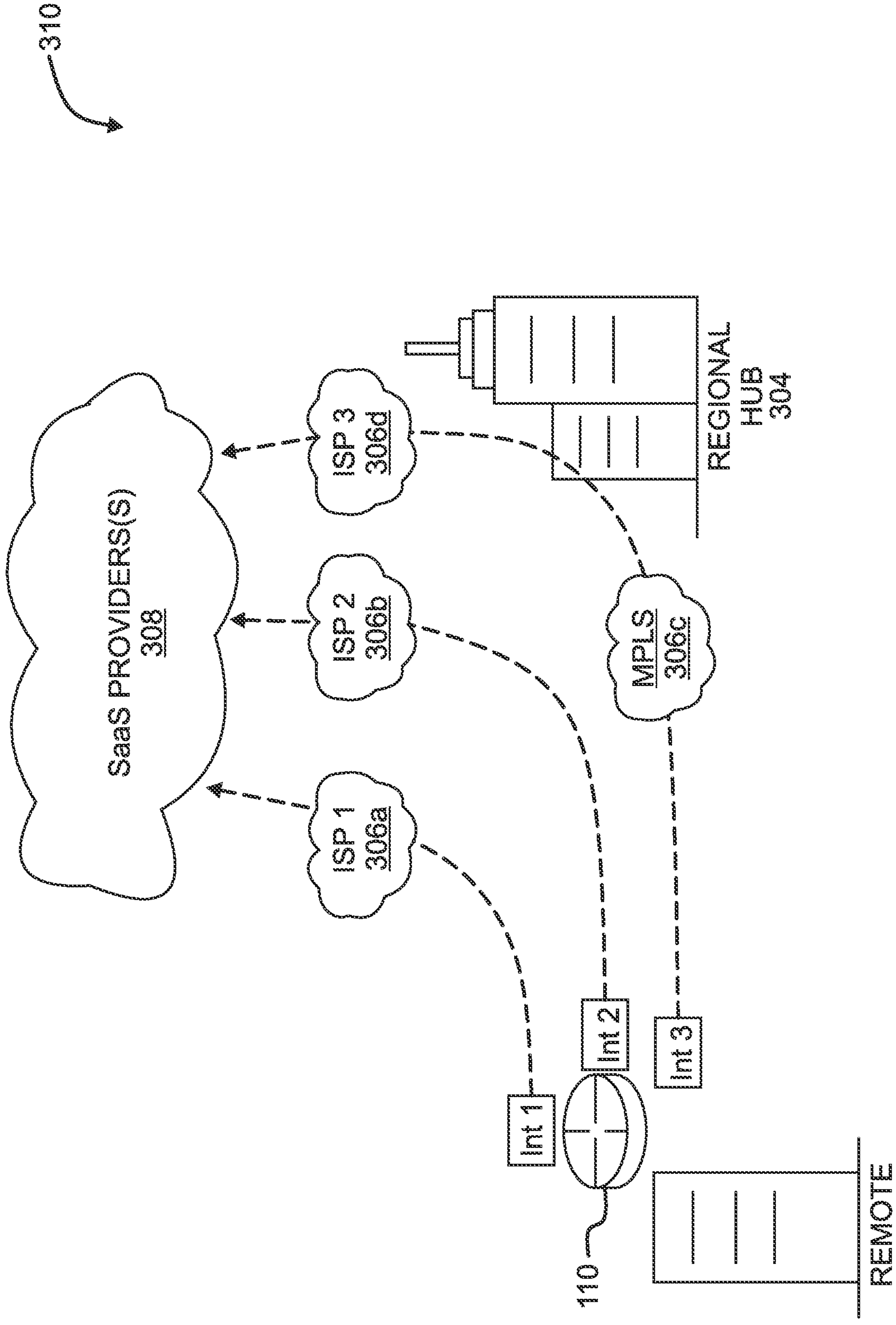

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider(s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
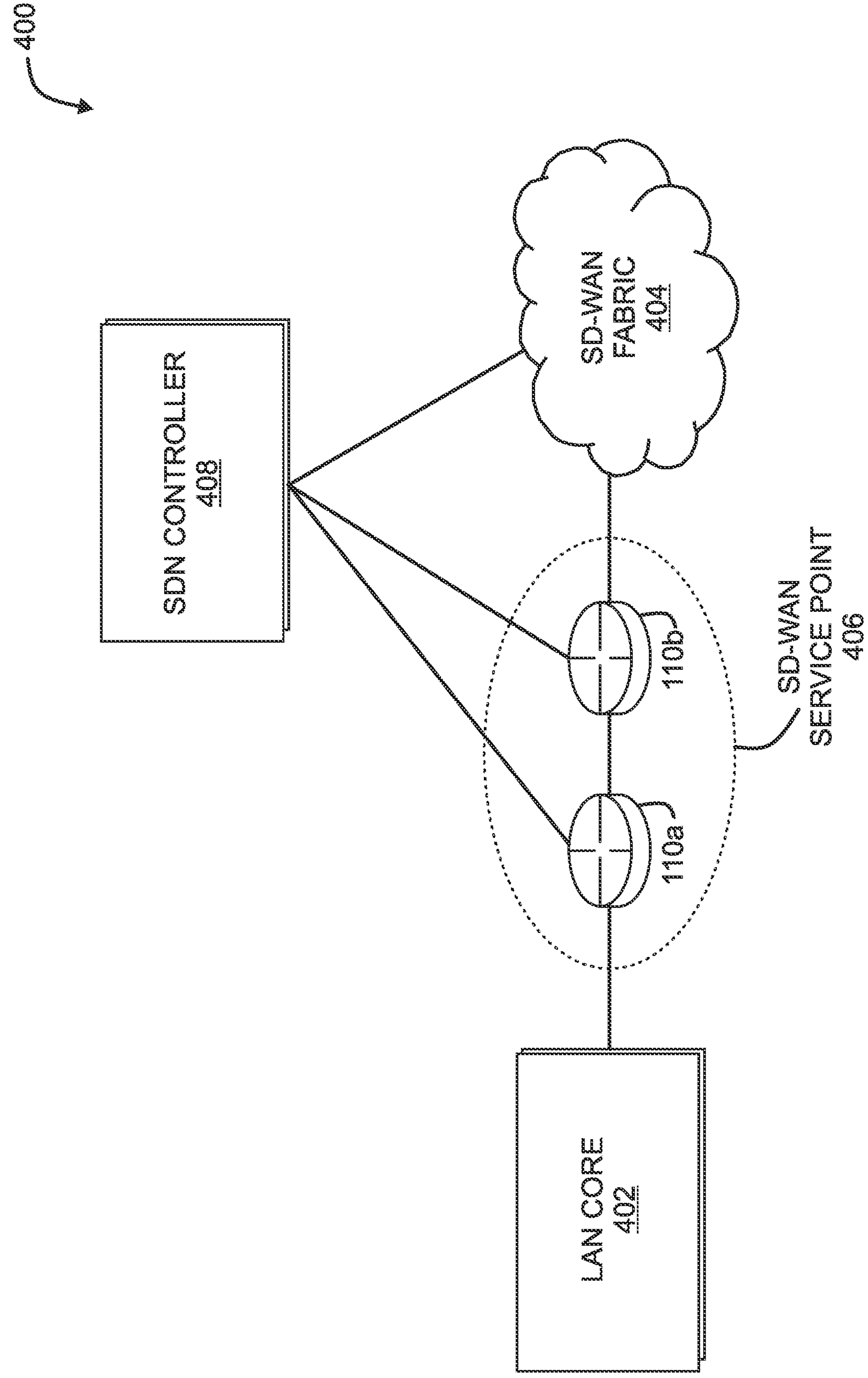
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

- New in-house applications being deployed;
- New SaaS applications being deployed everywhere in the network, hosted by a number of different cloud providers;
- Internet, MPLS, LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

However, building a user-facing product from an LLM-based agent can be difficult for reasons such as the following:

- An agent flow to answer a question may require multiple steps, each of which can take some time, individually. Consequently, the system may take a noticeable amount of time to provide an answer to the original question (e.g., on the order of minutes), which can be frustrating to users.
- LLMs can make mistakes which may not be apparent to a user. For example, consider the case of an LLM that can generate code that calls an API to list network devices but somehow provides an incorrect filter argument to the API. When the API returns an empty result set, a user may interpret this result as meaning that no devices match their desired criteria while, in fact, the system simply called the API incorrectly. These issues can be hard to avoid due to the opaque and non-deterministic nature of LLMs, and users may quickly lose confidence in the system when faced with such issues.
- Although LLMs can provide an alternative user experience by allowing a user to ask questions about a system using natural language, users often have years of familiarity with traditional web or application user interfaces. A chatbot can feel like a disconnected experience from those user interfaces, which can also be frustrating to users.

In general, self-healing networks, also sometimes called "autonomous networks" or "self-driving networks," refers to the ability of a network to close the loop whereby automation actions are triggered when specific event takes place (e.g., reporting of an issue, detection of an issue, etc.). However, for the reasons above, LLMs have not been used to trigger actions in self-healing networks, due to the myriad of challenges associated with their use for network monitoring and control.

Using an LLM-Based Agent to Provide Self-Healing Capabilities to a Network

The techniques herein introduce an LLM-based troubleshooting and monitoring agent that can be used to both troubleshoot an issue and trigger a set of actions in order to solve the issue. In some implementations, several conditions could be met for an issue to be eligible to self-healing, such as the criticality of the issues (determined by the volume of request sent to a bot for that issue). Various mechanisms are then used to determine whether the set of actions led to the resolution of the issue. Successful resolutions are then used to record successful troubleshooting trajectories and thus improve the training of the agent.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Figure 5:
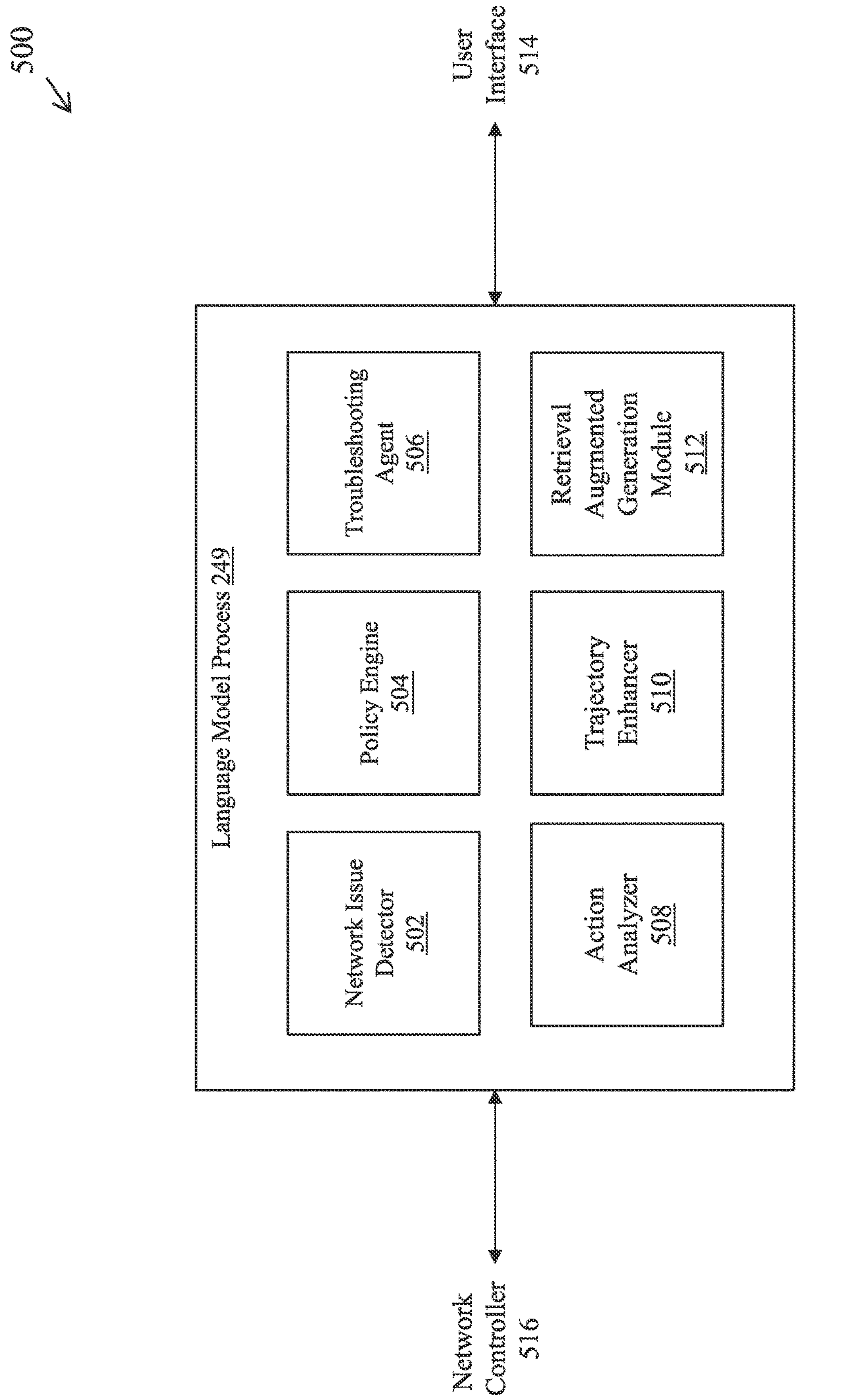
FIG. 5 illustrates an example architecture for using a large language model (LLM)-based agent to provide self-healing capabilities to a network.

Operationally, FIG. 5 illustrates an example architecture 500 for using a large language model (LLM)-based agent to provide self-healing capabilities to a network, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 516, either locally or via a network, such as via one or more application programming interfaces (APIs), etc.

As shown, language model process 249 may include any or all of the following components: a network issue detector 502, a policy engine 504, a troubleshooting agent 506, an action analyzer 508, a trajectory enhancer 510, and/or a retrieval augmented generation module 512. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

During execution, network issue detector 502 may detect an issue in a network and assess its criticality. To do so, network issue detector 502 may employ any number of modes for the issue detection. In one case, network issue detector 502 may explicitly list the set of issues eligible for self-healing functionality (e.g., detection of a link/router down, congestion thresholds for a given link layer, trigger of a recovery mechanism such as IGP/FRR, automated network tests or probes failing). In another case, network issue detector 502 may detect an issue based on information from a (troubleshooting) bot receiving requests from a set of users, in which case the issue can be created on-the-fly, if the number/rate of requests related to (a specific type of) issue exceeds a given threshold (e.g., via a chatbot).

Once network issue detector 502 has detected an issue I, it may then determine the criticality of that issue. To that end, one option may consist in checking the number of potential users who raised a similar issue that share the same root cause according to the root causing process initiated by troubleshooting agent 506, as described below, or its LLM may also be used to determine whether the issues raised by the users have a common root cause. In other cases, an LLM may determine criticality based on the number of impacted systems or applications or the volume of affected network traffic.

Policy engine 504 is used to configure which issues identified by network issue detector 502 are eligible for LLM-based self-healing capabilities. Indeed, despite the potential power of self-healing networks, the effective use of dynamic closed-loop control is subject to debate. Consequently, some administrators are ready to adopt closed-loop control with no human in the loop wherever and whenever possible, whereas others do mandate the presence of a human to perform any action in the network, sometimes such decisions are even driven by regulations. To this end, policy engine 504 allows a network administrator to specify policies to selectively enable or disable the self-healing capabilities of the system with respect to certain types of issues.

For example, a network administrator may specify via policy engine 504 (e.g., using a user interface 514) the set of applications eligible to for self-healing resolution and/or whether a minimum number of users per application type is required to automatically trigger closed-loop control according to troubleshooting agent 506. Further constrains can be defined for governing in which parts of the network (specific sites) or on which types of devices troubleshooting agent 506 is allowed is allowed to attempt remediation actions. For example, a network administrator may allow troubleshooting agent 506 to initiate the reboot of a wireless access point, while restricting the same action on a core router or central firewall.

According to various implementations, troubleshooting agent 506 may leverage one or more LLMs to troubleshoot an issue identified by policy engine 504, find the actual root cause for the issue, and/or suggest a set of one or more actions to fix the issue. Let ai denote an action used for troubleshooting an issue I and let Ai denote an action (configuration change) on the network (closed-loop control). The set of actions Ai required to solve the issue I may be determined on-the-fly by an LLM, statically determined according to a cookbook for each trajectory made of a set of action ai, or the like. For example, a static cookbook may be used to map a specific ak to set of actions Ak,1. Consider the action ak="Check the priority queue length of a router," a static set of action ak,1 may be used to trigger a set of 1 action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified for issue I is eligible for self-healing action (according to policy engine 504), troubleshooting agent 506 may perform any or all of the following:

- Troubleshooting agent 506 retrieves the set of action Ai for the root cause of issue I after activating a timer T (max time to solve the issue)
- Troubleshooting agent 506 may also employ various optimization criterion may be used for solving a given task T. For instance, troubleshooting agent 506 may solve some tasks with objective metrics such as reducing the processing time or improve accuracy even at the risk of involving more steps and tokens (cost). In the context of the techniques herein, the issue criticality from network issue detector 502 may also drive the optimization criteria (time versus reliability versus cost). In one implementation, the optimization criteria may be unique and decided according to policy and criticality. In another implementation, troubleshooting agent 506 may trigger multiple actions in parallel, each with different optimization criterion. For example, for a given issue I, troubleshooting agent 506 may send a request to a first LLM with a first criteria (e.g., solve as quickly as possible, optimizing time) and send the same request to a second LLM with different optimization criteria (e.g., efficiency). In such a case, troubleshooting agent 506 may use the reply to the first request (set of resolution action Ai) to quickly fix the network, followed by using the second set of actions to optimize the resolution of the issue. Note that both requests may not overlap in terms of closed-loop actions, as well.

Action analyzer 508 may assess whether the set of actions triggered by troubleshooting agent 506 have actually solved the issue. To that end several approaches may be used:

- The LLM may itself ask to the users who had originally expressed some concerns whether the issue has been remediated.
- The agent may check the various set of actions ai along the debugging trajectories whether the conditions that were used to identify the issues have been cleared. For example, back to the previous example, the system may check the high priority queue length and determine whether the action (change the weight) has solved the issue.

In some implementations, trajectory enhancer 510 is used to enhance the set of successful trajectories. As would be appreciated, troubleshooting agent 506 represents a complex troubleshooting and monitoring mechanism that may be based on one or more LLMs, a local database, and other components. On receiving a question, troubleshooting agent 506 may form a prompt after retrieving a set of "information" from a local database and triggers a set of actions ai (i.e., code snippet used to retrieve information from APIs, etc.) until an answer to the question is provided.

In this context, a "trajectory" refers to a set of successive actions ai triggered by troubleshooting agent 506 according to the LLM input. In some instances, trajectory enhancer 510 may use the trajectories to train one or more of the LLMs to perform similar troubleshooting tasks, stored as recipes (set of successful actions, etc.). For instance, action analyzer 508 may flag an action as successful if the answer from troubleshooting agent 506 satisfies a set of characteristics for a given (manual crafted) scenario.

In some instances, trajectory enhancer 510 may also function as a "troublemaker," generating issues and then requesting that troubleshooting agent 506 solve them, knowing the answer to the question, beforehand. Thanks to the techniques herein, knowing whether an issue has been solved can be told by determining whether the issue has been solved (an even stronger assumption than in the case of finding a known root cause). Thus, each time the issue is solved by triggering one of more action Ai that solves the issue I, the corresponding trajectory is marked as successful and the list of action ai can be added to the database of successful trajectories.

Figure 6:
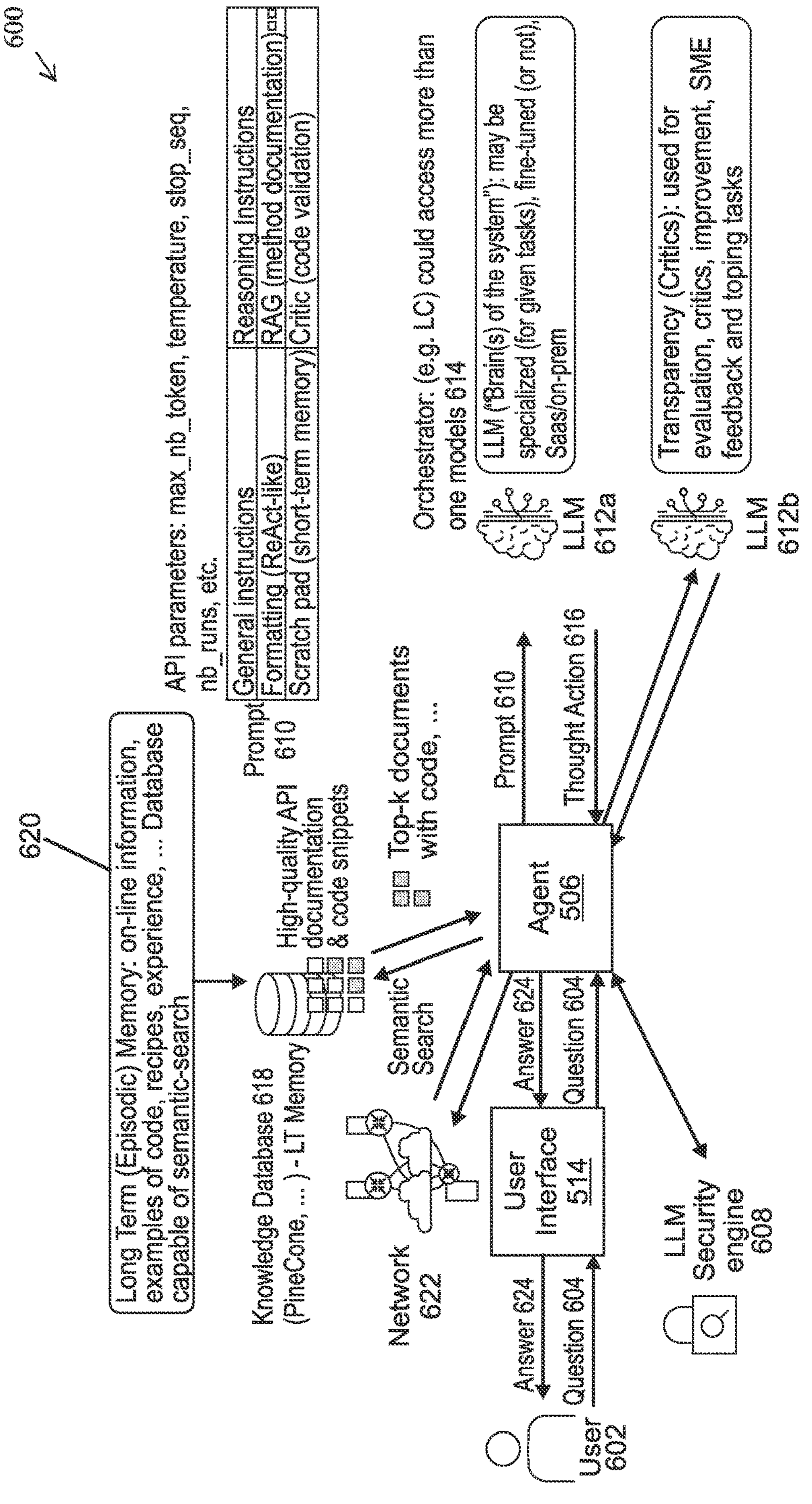
FIG. 6 illustrates the operation of an LLM-based network troubleshooting agent.

FIG. 6 illustrates an example 600 showing the operation of an LLM-based troubleshooting agent 506 performing self-healing actions in a network 622, according to various implementations. As shown, troubleshooting agent 506 may interact with one or more LLMs 612, such as LLMs 612*a*-612*b* shown, to perform self-healing actions in a network 622. These LLMs may be integrated directly into troubleshooting agent 506 or accessed by troubleshooting agent 506 remotely, such as via an API. In some implementations, each of these LLMs may have different capabilities, as well. For instance, LLM 612*a* may a 0-shot or model trained using Low-Rank Adaptation of LLMs (LoRA), whereas LLM 612*b* may be a fine-tuned model (e.g., using T5 with LoRA, knowledge distillation, etc.) with decoding lop access for constrained prompting. In some instances, troubleshooting agent 506 may also leverage an intermediary orchestrator 614 that can access one or more of the LLMs, such as LLM 612*a* and LLM 612*b*.

In further cases, LLM 612*b* may be a critic model that is used to critique any outputs of LLM 612*a*. For instance, say that LLM 612*a* generates code to perform a certain task (e.g., to retrieve certain information from a network controller or other entity). In such a case, LLM 612*b* may assess the quality of the code (e.g., to make sure it is not missing information, correctly calls a certain method or API, is able to perform the desired task, etc.). Feedback from LLM 612*b* can then be fed back to LLM 612*a*, to enhance its operations.

Assume now that a user 602 enters a question 604 via user interface 514 regarding network 622. Note that while such input typically takes the form of a question, mere statements such as "my network connection is slow, etc." are also equally possible inputs. In turn, troubleshooting agent 506 may seek to answer question 604 by interacting with network 622, interacting with a knowledge database 618 populated by a long term (episodic) memory 620 (e.g., by performing a semantic search for API formats, code snippets, recipes, sample use cases, or the like) using retrieval augmented generation module 512, and/or by issuing a prompt 610 for input to any of LLMs 612. Note that prompt 610 may also indicate general instructions and/or reasoning instructions, to obtain information regarding an action 616. In some instances, an LLM security engine 608 may also oversee the actions of troubleshooting agent 506, to prevent conditions such as prompt injection attacks, etc.

In some cases, troubleshooting agent 506 may also implement action 616 in network 622. For instance, troubleshooting agent 506 may send a command to a network controller of network 622 (e.g., via an API) to reconfigure the network to address any issues. In turn, troubleshooting agent 506 may provide an answer 624 back to user interface 514 to answer question 604 (e.g., "your connection was slow because of a misconfiguration-please let us know if the issue has been resolved," etc.).

As noted above, LLM powered agents, such as troubleshooting agent 506, can interact with a real environment through the use of tools. A tool is a pre-defined routine that the LLM can indicate it wants to invoke. As part of the agent workflow, the tools available are described in the prompt, and the LLM produces a text output indicating which tool to invoke, as well as possibly input parameters to pass to the tool. For example, tools can be provided to run a query against a search engine, call a specific API, or send an email. The agent then invokes the tool and provides the tool's output text back to the model in a new prompt.

APIs from network controllers may return a large quantity of data that needs to be processed to answer the question. Very rarely will there be an API that directly provides the answer to a user's question. Instead, answering analytical and troubleshooting questions will require combining results from multiple API calls. In simple cases, processing may amount to simple filtering. In more complex cases, processing can require joining the results from multiple API calls, doing aggregation, running statistical procedures on the data (e.g., correlating multiple signals), etc. This cannot be carried out using static tools.

One potential way to address these issues would be to expose a single tool that takes as input code in a programming language and evaluates that code. The LLM is then prompted to write code that calls the APIs and processes the result. This can mean either directly invoking REST APIs by making HTTP requests, or using language-specific software development kits (SDKs), either handcrafted or automatically generated from API specifications. SDKs often provide language-specific models (e.g., classes and instances corresponding to the entities defined by the REST API). The LLM can then leverage the capabilities of the language to process that data and come up with an answer to the question.

Still, even with a code interpreter tool and SDKs for network controllers, the LLM prompt must contain enough documentation about relevant pieces of the SDK to answer the question. Network controllers have large APIs, with hundreds or thousands of API endpoints. As such, it is not feasible to include them all in the prompt, which is limited in size due to computational, cost and accuracy constraints. Instead, retrieval-augmented generation (RAG) can be used: the question is used to retrieve a set of relevant SDK entities or methods, and only those are provided to the model in the prompt. The quality of the retrieval is paramount: if the LLM is not provided with the right parts of the SDK, it will not be able to answer the question. In addition, models tend to hallucinate more when the right documentation is not provided, which can lead to failure modes that are difficult to troubleshoot.

Retrieval can be performed by computing embedding vectors for the question, as well as for all of the methods or properties available in the library. However, the question often only encodes the final goal, but not the steps to get there. For example, consider the following question: what is the overall health score at the site where John is connected? Retrieval based on that question may find that Site.health_score (the health score of the Site object of the network controller SDK) has the health score. However, the model would need to first build a Site object corresponding to the user John and would not know how to proceed unless the corresponding details are also retrieved.

Graph-Based RAG of SDK Schemas for a Language Model-Based Network Troubleshooting Agent According to various implementations, the techniques herein introduce a way to retrieve not only the most obvious parts of the SDK based on the question, but also parts that may be useful to actually get there. In some aspects, the techniques herein combine an entity resolution step, which extracts entities from the question, and maps them to SDK instances, with retrieval of paths in the graph of SDK entities. Doing so provides much more actionable retrieval results than standard RAG, allowing the system to answer much more complex questions without the need for additional workarounds at the level of the agent.

Specifically, according to various implementations, a device maintains a graph in which nodes of the graph represent entities in a computer network and edges of the graph represent relations between those entities. The device performs a search of the graph based on a query for input to a language model-based troubleshooting agent for the computer network. The device generates, based on the search, a schema in a particular programming language to answer the query. The device provides the schema to the language model-based troubleshooting agent to generate an answer to the query.

Figure 7:
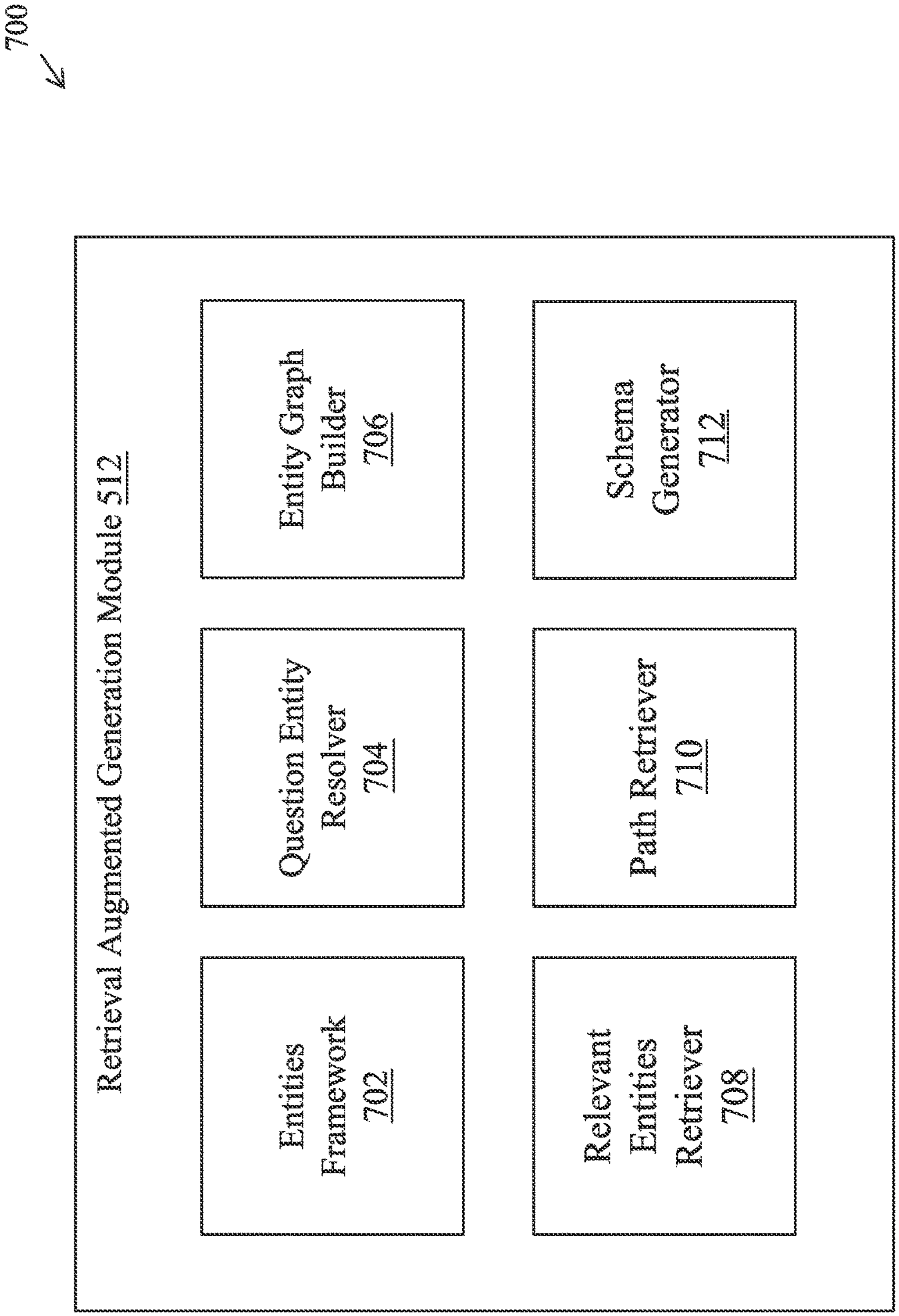
FIG. 7 illustrates an example architecture for a retrieval augmented generation (RAG) module.

FIG. 7 illustrates an example architecture 700 for a retrieval augmented generation (RAG) module, such as retrieval augmented generation module 512 in FIG. 5, according to various implementations. As shown, retrieval augmented generation module 512 may include any or all of the following sub-components: an entities framework 702, a question entity resolver 704, an entity graph builder 706, a relevant entities retriever 708, a path retriever 710, and/or a schema generator 712. As would be appreciated, these sub-components may be combined or omitted, as desired. In addition, they may be executed by a singular device or in a distributed manner, in which case the set of executing devices may be viewed as a singular device for purposes of the techniques herein.

For purposes of illustration, code examples herein are provided in Python for the code interpreter and network controller SDKs, without loss of generality. Of course, other languages could be used as well, in further implementations.

As noted above, troubleshooting agent 506 may be configured with a code interpreter tool. This allows troubleshooting agent 506 to integrate with the network controllers and to retrieve the right fragments and schema and documentations from the SDK.

In various implementations, entities framework 702 may define classes for various types of entities exposed by the network controllers and abstracts away the raw network controller SDKs. For example, the following classes can be defined:

```
class Client(BaseModel):
ip: str=Field("IP address of the client")
mac: str=Field("MAC address of the client")
network_device: Device|None=Field("Network device
   that the client is currently connected to")
. . .
class Device(BaseModel):
id: str=Field("ID of the device")
mac: str=Field("MAC address of the device")
system_ip: str=Field("System IP address")
tlocs: list[WanCircuit]=Field("TLOCs (WAN circuits) at
   this device")
@staticmethod
def all( )→Dataframe[Device]:
"""Returns a dataframe with all devices in the net-
   work."""
. . .
class WanCircuit(BaseModel):
color: str=Field("SDWAN color", examples=["mpls",
   "public-internet"])
```

operation_state: Literal["up", "down"]=Field("SDWAN operation state.")

. . .

Here, "Client," "Device," and "WanCircuit" are referred to as entities. Instances of these entities are referred to as instances.

Instances can be manipulated individually, or through a data frame structure, which contains multiple instances of a given entity. Instances can be constructed either directly, or using constructors defined on the classes. For example:

john=Client(ip="1.2.3.4") #Instance for John circuits=WanCircuit.all( ) #Dataframe with all existing WAN circuits The fields defined on each entity class are referred to herein as "properties." For example, ip, mac and network_device are properties of the Client entity. A property with type corresponding to another entity is referred to as a "relation." Here, the network_device property is a relation as it points to a Device entity. Similarly, the tloc property is a relation as it contains a list of WanCircuit instances.

In various implementations, question entity resolver 704 may attempt to extract reference entities in the text of the question and to map them to instances of entities in entities framework 702. For example:

- Given the question "What is the IP address of John?," question entity resolver 704 may return an instance of the Client class corresponding to John, provided it exists.
- Given the question "How much Youtube traffic has IP 10.1.1.1 sent over the past 6 months?," question entity resolver 704 may return an instance of the Client or Device class corresponding to 10.1.1.1, depending on its nature. Additionally, if entities framework 702 has a notion of application, it can return an instance of Application that contains a normalized version of the Youtube application mentioned in the question.

In some implementations, question entity resolver 704 may use a mix of regular expressions and LLM to extract various entities in the text, such as IP addresses, MAC addresses, strings looking like hostnames or site names, geographical designations, etc. For each such reference, question entity resolver 704 then attempts to build various possibly relevant entity instances from entities framework 702. For example, given an IP address, question entity resolver 704 may attempt the following:

- Try to build a Client instance, if the IP is associated to a network client.
- Try to build a Device instance, if the IP is the system IP associated to a network device.
- etc.

In various implementations, entity graph builder 706 may be responsible for building a graph of entities. To do so, entity graph builder 706 may take as input the following contextual information:

- Instances of entities resolved from the question.
- If the code interpreter has already run in previous steps of the agent flow, the list of entity instances that have been created by the code written by the model.

Typically, the graph is directed and consists of edges and nodes. Each node may also have the following metadata:

- Entity name that the node corresponds to
- A type, which can be either:
  - INSTANCE_CONSTRUCTIBLE, to indicate that one or more instances of the entity are already available or can be constructed recursively from an instance available for another entity by following relations.
  - DIRECTLY_CONSTRUCTIBLE, to indicate that the entity has at least one constructor allowing to obtain a data frame of such entities without constructing them explicitly (e.g., as in WanCircuit.all( ) above), or that it can be constructed recursively from such a constructor by following entity relations.
  - INSTANCE_CONSTRUCTIBLE & DIRECTLY_CONSTRUCTIBLE, when the entity qualifies for both.
- A label to identify source nodes from other nodes.

Each edge from an entity S to an entity T has the following metadata: a list of relations (i.e., the names of property that are relations) which can be used to go from S to T.

Entity graph builder 706 may then proceed as follows:

- First, entity graph builder 706 may initialize the graph with source nodes. For each entity for which either an instance is already available or can be directly constructed using a constructor on the entity class, it may then add a node to the graph. It may also set the node type, accordingly.
- For each source node, entity graph builder 706 determines which other entities can be obtained by following direct relations on the source node's entity. For each such entity, it may add a node to the graph, with the node type set accordingly. Entity graph builder 706 may then add edges between each source node and the new entity node. On each edge between S and T, entity graph builder 706 may set the list of relations as follows:
  - If S is DIRECTLY_CONSTRUCTIBLE, all relations from S to T are included.
  - Otherwise, only relations where at least one instance of S has a non-null or non-empty (for lists) value are included. These values are then cached as additional edge metadata to be used in the next step.
- Entity graph builder 706 may then repeat this process for a set number of iterations, then stops.

The resulting graph is provided to relevant entities retriever 708, as detailed below.

Figure 8A:
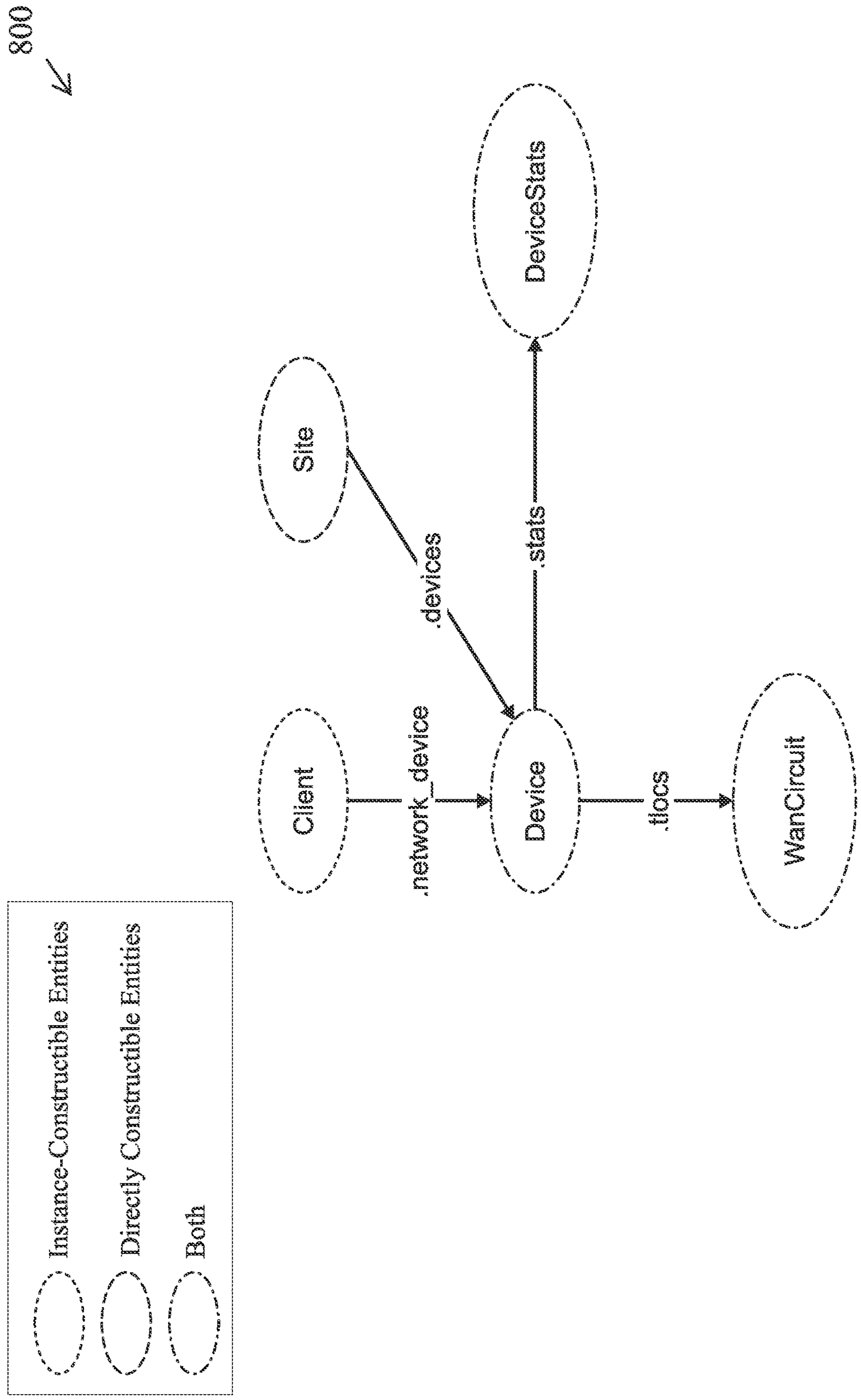
FIGS. 8A-8D illustrate graphs of software development kit (SDK) schemas.

FIGS. 8A-8D illustrate graphs of software development kit (SDK) schemas; and A sample graph 800 is shown in FIG. 8A, for a framework similar to the previous example, and assuming a single instance of type Client has been resolved from the question. As can be seen, the Client is INSTANCE_CONSTRUCTIBLE, while Site is DIRECTLY_CONSTRUCTIBLE. Consequently, all other entities in graph 800 are both INSTANCE_CONSTRUCTIBLE and DIRECTLY_CONSTRUCTIBLE.

In various implementations, relevant entities retriever 708 may use an embedding vector associated to both an input question and with each entity property to retrieve a set number of properties. For each entity E and property P of E, D[E,P] denotes the embedding vector for that property. The text to embed can be built based on the property name, property description, type, example values, default values, or from details of the entity itself. A text embedding model can be used, such as a sentence transformer model, or a commercial model such as OpenAI's text-embedding-ada-002.

Relevant entities retriever 708 may then proceed as follows:

- Transform the question into an embedding vector D.
- Query a database where the embedding vector for properties are stored, with the following query parameters:
  - Only query properties for entities that are part of the graph built by entity graph builder 706. This excludes entities that cannot be built in a set number of steps from what is already available or directly constructible.

Sort properties by a similarity score between their embedding vector and the question's embedding vector, D, descending.

Only retrieve the top K properties.

Optionally, only retrieve properties where the similarity score is greater than a set threshold.

Group all of the retrieved properties by entity and associates an entity-level similarity score. Relevant entities retriever 708 may compute the score using various heuristics, such as taking the maximum similarity score over all retrieved properties of the entity.

Keep only the top R entities with the highest similarity scores. These entities are referred to as the "relevant" entities.

Once complete, relevant entities retriever 708 may then provide the list of relevant entities along with their entity level scores and list of retrieved properties for each entity to path retriever 710.

In various path retriever 710 may be responsible for identifying all the paths from source nodes to each relevant entities and selecting some of those for inclusion in the output of the overall retrieval procedure. To do so, path retriever 710 may proceed as follows:

First, run an all-pairs shortest path algorithm (such as Bellman-Ford) on the reversed graph where the direction of all edges has been flipped.

For a given relevant entity, the previous step provides the list of all shortest paths from all source nodes to the relevant entity. The purpose of path retriever 710 is then to select one or a few of those paths to include the corresponding nodes and edges in the output of the retrieval.

Figure 8B:
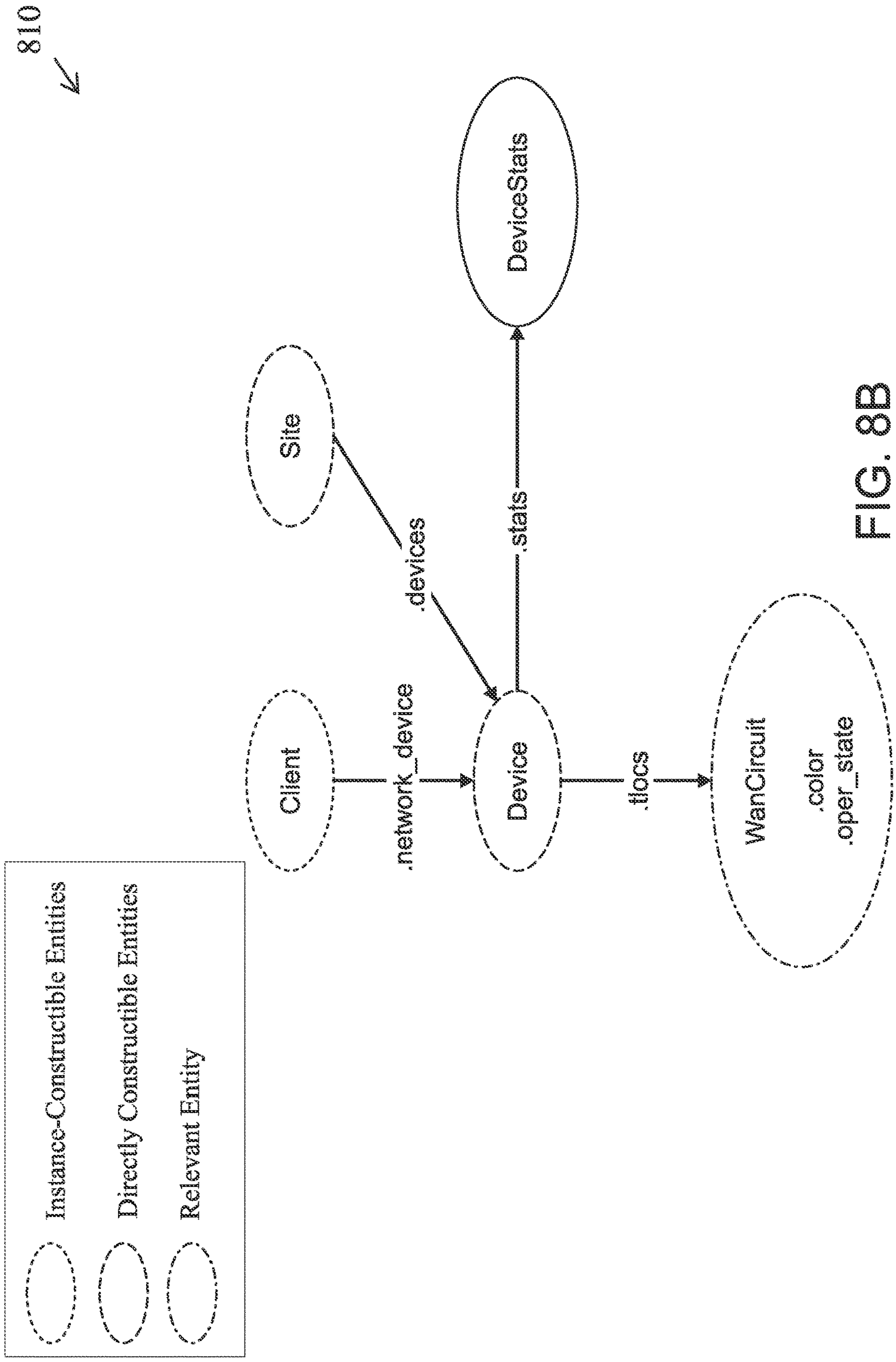
Figure 8C:
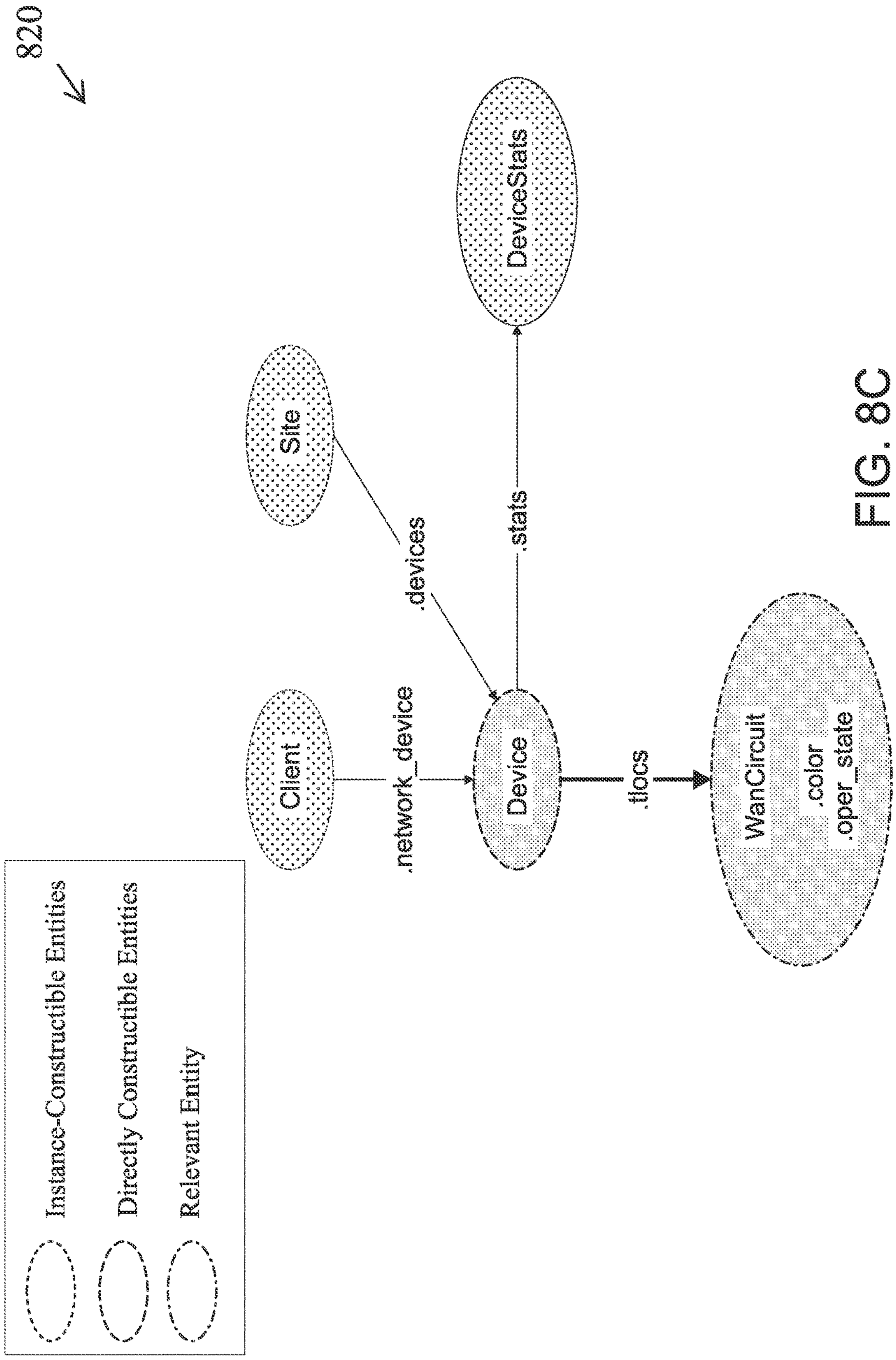

As an example, consider graph 810 in FIG. 8B, with a single relevant entity and three source entities (Client, Site, Device).

Here, path retriever can use various heuristics to select path sets:

Select all paths. This can lead to a verbose retrieval output, especially if the graph has high connectivity.

Only select the shortest path. This is the simplest option, although it can lead to counterintuitive results. In the current example, the shortest path is to go from the directly constructible entity Device directly to WanCircuit, although a Client instance is available. The shortest path is shown in graph 820 in FIG. 8C. Since a client instance is available, it may make sense to retrieve that path instead or in addition to the one directly going from the full data frame of devices.

Figure 8D:
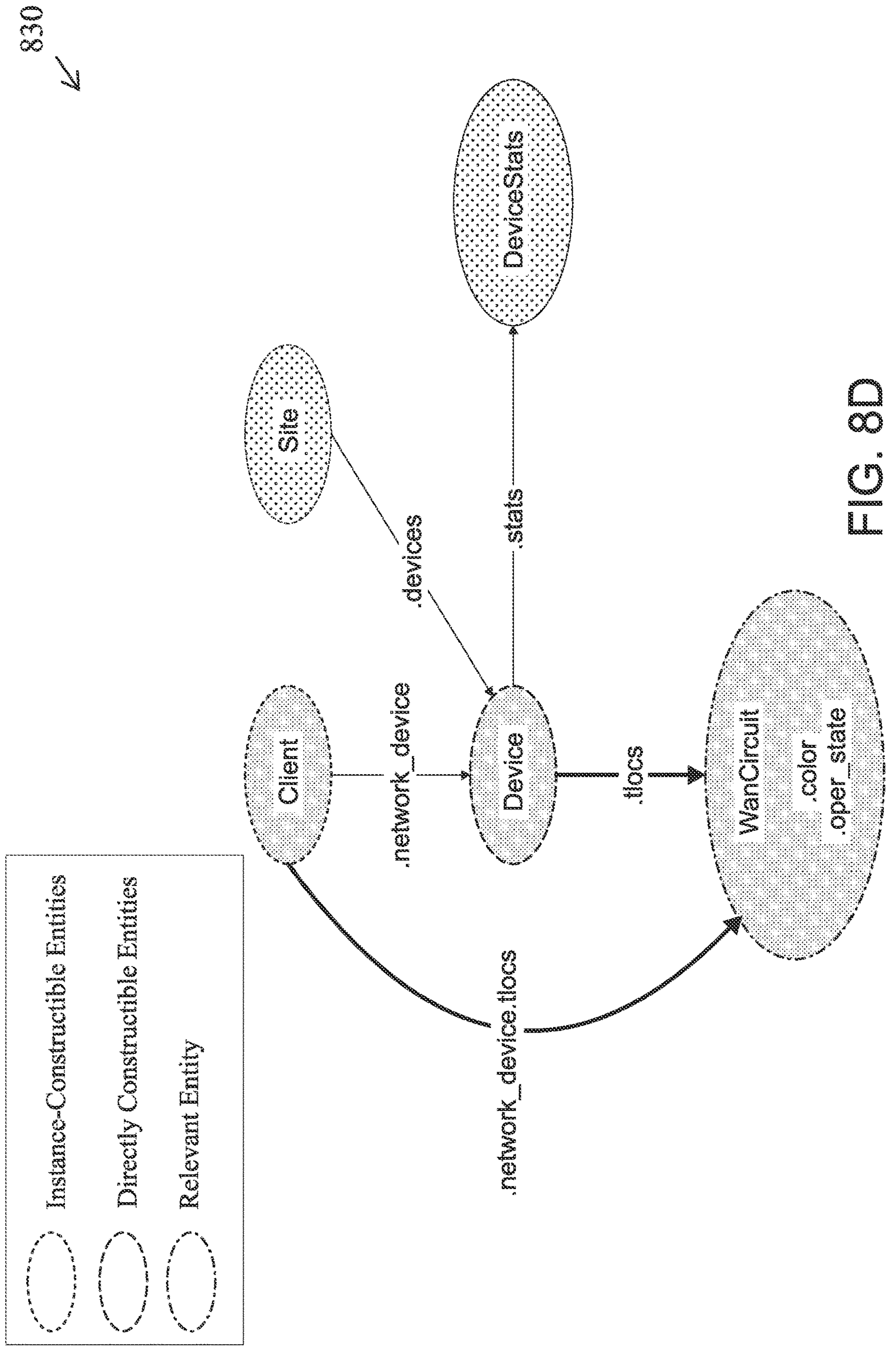

Select up to one path starting from a DIRECTLY_CONSTRUCTIBLE source node, and up to one path starting from an INSTANCE_CONSTRUCTIBLE source node. This provides a middle ground that works around some of counterintuitive examples mentioned above. This retrieves both kinds of sources when they are needed. For example, consider the question: "List all the devices that have the same model as the device to which user Chiara is connected." This would require to both check the model of device A, and to check the list of devices to filter only on those matching that of device A. For instance, graph 830 in FIG. 8D shows both paths: one path from the Client instance, and one from the Device data frame.

Different options are also available for the notion of edge weight to adopt when path retriever 710 considers shortest paths: edges can have a static weight of 1 or can have a weight determined empirically through trial and error.

Path retriever 710 then passes the set of paths for each relevant entity on to schema generator 712.

In various implementations, schema generator 712 is responsible for taking all selected entities and generating sample schemas in the target programming language.

As a first step, schema generator 712 may build a unified representation of the different roles that each entity plays. Here, an entity can be:

A relevant entity, that is not itself a source entity nor on a path to another relevant entity.

A relevant entity that is also a source entity.

A relevant entity that is also on a path to another relevant entity.

A source entity that is not a relevant entity nor on the path to another entity

This can be repeated for all similar combinations. For each entity, schema generator 712 may build a representation with the following fields:

IS_RELEVANT_ENTITY

IS_SOURCE_ENTITY

IS_INDIRECTLY_RELEVANT_ENTITY, indicating whether it is on one or more paths to a relevant entity.

RELEVANT_PROPERTIES, which contains a set of properties relevant for that entity. This can be set using the following logic:

If IS_RELEVANT_ENTITY is true, add all the properties retrieved in the relevant entity.

If IS_INDIRECTLY_RELEVANT_ENTITY is true (which includes source entities), add all the properties attached to edges from the entity to the next entity in each corresponding path.

Based on this representation, schema generator 712 may then build schemas or type definitions in the target programming language, by iterating over entities, and iterating over RELEVANT_PROPERTIES for each entity.

For example, consider a single relevant entity WanCircuit, with retrieved properties color and operation_state. A path was retrieved going from Client to Device and then to WanCircuit. In such a case, schema generator 712 may produce the following output (comments are provided for clarity and need not be included):

```
#IS_RELEVANT_ENTITY=false
#IS_SOURCE_ENTITY=true
#IS_INDIRECTLY_RELEVANT_ENTITY=true
#RELEVANT_PROPERTIES=[network_device]
class Client(BaseModel):
network_device: Device|None=Field("Network device that the client is currently connected to")
. . .
#IS_RELEVANT_ENTITY=false
#IS_SOURCE_ENTITY=false
#IS_INDIRECTLY_RELEVANT_ENTITY=true
#RELEVANT_PROPERTIES=[tlocs]
class Device(BaseModel):
tlocs: list[WanCircuit]=Field("TLOCs (WAN circuits) at this device")
. . .
#IS_RELEVANT_ENTITY=true
#IS_SOURCE_ENTITY=false
#IS_INDIRECTLY_RELEVANT_ENTITY=false
#RELEVANT_PROPERTIES=[color, operation_state]
class WanCircuit(BaseModel):
color: str=Field("SDWAN color", examples=["mpls", "public-internet"])
operation_state: Literal
```

Figure 9:
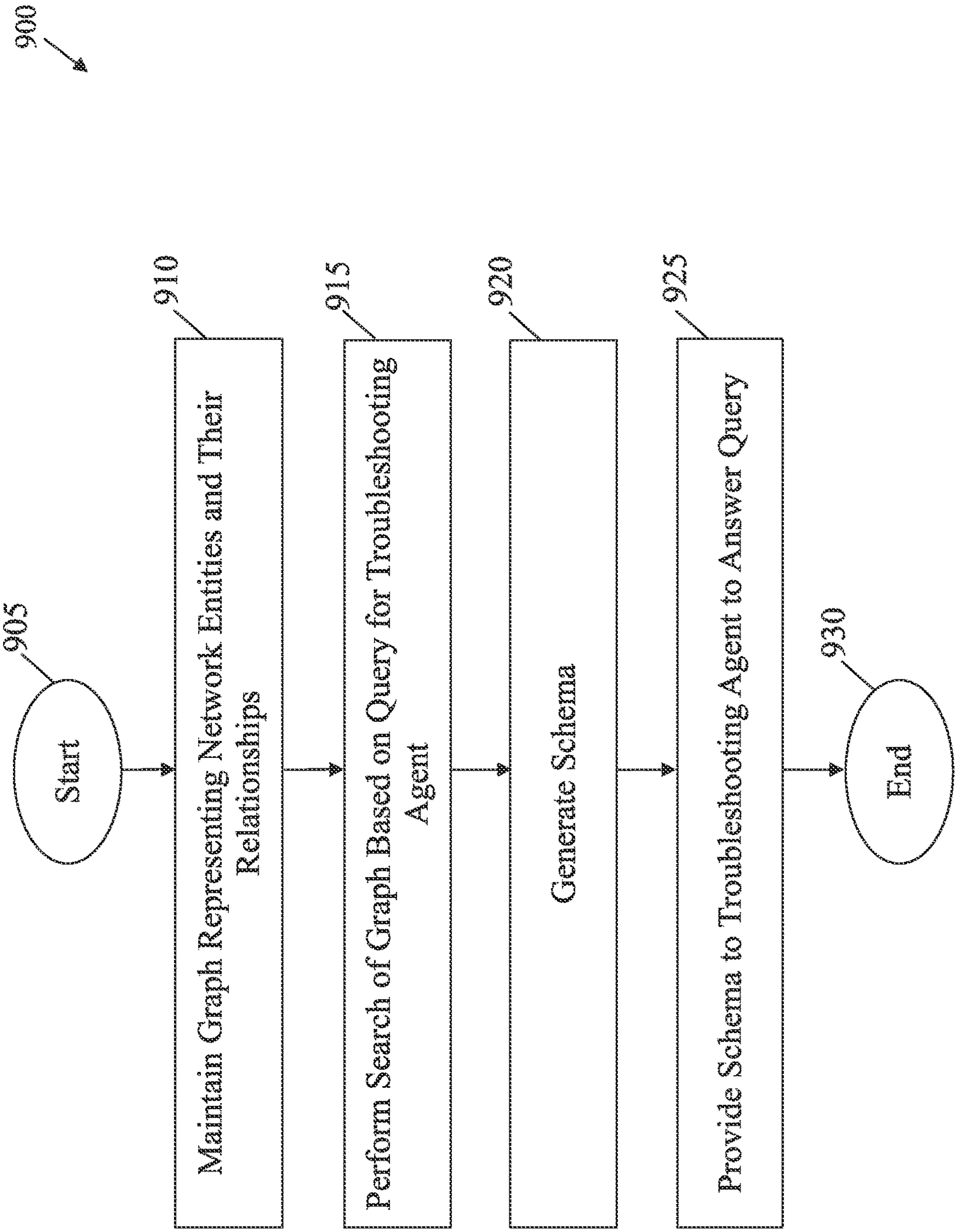
FIG. 9 illustrates an example simplified procedure for graph-based retrieval augmented generation of SDK schemas for a language model-based network troubleshooting agent.

FIG. 9 illustrates an example simplified procedure 900 (e.g., a method) for graph-based retrieval augmented generation of SDK schemas for a language model-based network troubleshooting agent, in accordance with one or more implementations described herein. For example, a non-generic, specifically configured device (e.g., device 200), such as a router, firewall, controller for a network (e.g., an SDN controller or other device in communication therewith), server, or the like, may perform procedure 900 by executing stored instructions (e.g., language model process 249 and/or network control process 248). The procedure 900 may start at step 905, and continues to step 910, where, as described in greater detail above, the device may maintain a graph in which nodes of the graph represent entities in a computer network and edges of the graph represent relations between those entities. In some instances, the graph abstracts a software development kit associated with a network controller for the computer network. In some implementations, each node in the graph indicates whether an instance of its corresponding entity can be constructed for the schema recursively from another entity by following one or more relations in the graph. In various cases, the entities correspond to instances of at least one of: a client in the computer network, a networking device in the computer network, or a wide area network (WAN) circuit in the computer network.

At step 915, as detailed above, the device may perform a search of the graph based on a query for input to a language model-based troubleshooting agent for the computer network. In some implementations, the device may do so by performing a path search along the graph to identify those entities in the computer network that are relevant to the query.

At step 920, the device may generate, based on the search, a schema in a particular programming language to answer the query, as described in greater detail above. In some implementations, the schema indicates to the language model-based troubleshooting agent how to use the software development kit to retrieve information from the network controller regarding those entities in the computer network associated with the query. In one implementation, the schema includes one or more classes from the software development kit and properties of those one or more classes. In another implementation, the schema indicates whether a given entity is indirectly relevant to the query based on whether information regarding that entity is needed to retrieve information regarding another entity that is relevant to the query.

At step 925, as detailed above, the device may provide the schema to the language model-based troubleshooting agent to generate an answer to the query. In various implementations, the language model-based troubleshooting agent uses the schema as part of a prompt to a large language model to generate the answer to the query. In some cases, the device provides the schema to the language model-based troubleshooting agent as part of a retrieval augmented generation mechanism for the large language model.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for graph-based retrieval augmented generation of software development kit (SDK) schemas for a language model-based network troubleshooting agent, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

maintaining, by a device, a graph in which nodes of the graph represent entities in a computer network and edges of the graph represent relations between those entities, wherein the graph abstracts a software development kit associated with a network controller for the computer network;

performing, by the device, a search of the graph based on a query for input to a language model-based troubleshooting agent for the computer network;

generating, by the device and based on the search, a schema in a particular programming language to answer the query, wherein the schema includes one or more classes from the software development kit and properties of the one or more classes, and wherein the schema indicates how to use the software development kit to retrieve information from the network controller regarding entities in the computer network associated with the query; and providing, by the device, the schema to the language model-based troubleshooting agent to generate an answer to the query.

2. The method as in claim 1, wherein performing the search comprises:

performing a path search along the graph to identify those entities in the computer network that are relevant to the query.

3. The method as in claim 1, wherein the language model-based troubleshooting agent uses the schema as part of a prompt to a large language model to generate the answer to the query.

4. The method as in claim 3, wherein the device provides the schema to the language model-based troubleshooting agent as part of a retrieval augmented generation mechanism for the large language model.

5. The method as in claim 1, wherein each node in the graph indicates whether an instance of its corresponding entity can be constructed for the schema recursively from another entity by following one or more relations in the graph.

6. The method as in claim 1, wherein the schema indicates whether a given entity is indirectly relevant to the query based on whether information regarding that entity is needed to retrieve information regarding another entity that is relevant to the query.

7. The method as in claim 1, wherein the entities correspond to instances of at least one of: a client in the computer network, a networking device in the computer network, or a wide area network (WAN) circuit in the computer network.

8. The method as in claim 1, wherein performing the search comprises:

transforming the query into an embedding vector;

retrieving a plurality of embedding vectors for a set of properties of candidate entities;

sorting the set of properties based on a similarity score between an embedding vector of a respective property and the embedding vector; and identifying entities in the computer network that are relevant to the query based on the sorting.

9. The method as in claim 8, wherein performing the search further comprises:

identifying shortest paths from one or more source nodes to the entities in the computer network that are relevant to the query.

10. The method as in claim 1, wherein:

performing the search comprises identifying shortest paths from one or more source nodes to entities in the computer network that are relevant to the query; and generating the schema comprises:

building a unified representation that indicates, for each entity of the entities in the computer network that are relevant to the query, whether that entity is a relevant entity, a source entity, an indirectly relevant entity, or a combination thereof;

determining, for each entity of the entities in the computer network that are relevant to the query and based on the unified representation, a set of relevant properties to include in the schema, wherein:

for an entity that is a relevant entity, the set of relevant properties includes all properties retrieved for that entity; and for an entity that is an indirectly relevant entity, the set of relevant properties includes properties corresponding to relations to a next entity in one of the shortest paths.

11. An apparatus, comprising:

one or more network interfaces;

a processor coupled to the one or more network interfaces and configured to execute one or more processes; and a memory configured to store a process that is executable by the processor, the process when executed configured to:

maintain a graph in which nodes of the graph represent entities in a computer network and edges of the graph represent relations between those entities, wherein the graph abstracts a software development kit associated with a network controller for the computer network;

perform a search of the graph based on a query for input to a language model-based troubleshooting agent for the computer network;

generate, based on the search, a schema in a particular programming language to answer the query, wherein the schema includes one or more classes from the software development kit and properties of the one or more classes, and wherein the schema indicates how to use the software development kit to retrieve information from the network controller regarding entities in the computer network associated with the query; and provide the schema to the language model-based troubleshooting agent to generate an answer to the query.

12. The apparatus as in claim 11, wherein the apparatus performs the search by:

performing a path search along the graph to identify those entities in the computer network that are relevant to the query.

13. The apparatus as in claim 11, wherein the language model-based troubleshooting agent uses the schema as part of a prompt to a large language model to generate the answer to the query.

14. The apparatus as in claim 13, wherein the apparatus provides the schema to the language model-based troubleshooting agent as part of a retrieval augmented generation mechanism for the large language model.

15. The apparatus as in claim 11, wherein each node in the graph indicates whether an instance of its corresponding entity can be constructed for the schema recursively from another entity by following one or more relations in the graph.

16. The apparatus as in claim 11, wherein the schema indicates whether a given entity is indirectly relevant to the query based on whether information regarding that entity is needed to retrieve information regarding another entity that is relevant to the query.

17. The apparatus as in claim 11, wherein to perform the search comprises to:

transform the query into an embedding vector;

retrieve a plurality of embedding vectors for a set of properties of candidate entities;

sort the set of properties based on a similarity score between an embedding vector of a respective property and the embedding vector; and identify entities in the computer network that are relevant to the query based on the sorting.

18. The apparatus as in claim 17, wherein to perform the search further comprises to:

identify shortest paths from one or more source nodes to the entities in the computer network that are relevant to the query.

19. The apparatus as in claim 17, wherein:

to perform the search comprises to identify shortest paths from one or more source nodes to entities in the computer network that are relevant to the query; and to generate the schema comprises to:

build a unified representation that indicates, for each entity of the entities in the computer network that are relevant to the query, whether that entity is a relevant entity, a source entity, an indirectly relevant entity, or a combination thereof;

determine, for each entity of the entities in the computer network that are relevant to the query and based on the unified representation, a set of relevant properties to include in the schema, wherein:

for an entity that is a relevant entity, the set of relevant properties includes all properties retrieved for that entity; and for an entity that is an indirectly relevant entity, the set of relevant properties includes properties corresponding to relations to a next entity in one of the shortest paths.

20. A tangible, non-transitory, computer-readable medium storing program instructions that cause a device to execute a process comprising:

maintaining, by the device, a graph in which nodes of the graph represent entities in a computer network and edges of the graph represent relations between those entities, wherein the graph abstracts a software development kit associated with a network controller for the computer network;

performing, by the device, a search of the graph based on a query for input to a language model-based troubleshooting agent for the computer network;

generating, by the device and based on the search, a schema in a particular programming language to answer the query, wherein the schema includes one or more classes from the software development kit and properties of the one or more classes, and wherein the schema indicates how to use the software development kit to retrieve information from the network controller regarding entities in the computer network associated with the query; and providing, by the device, the schema to the language model-based troubleshooting agent to generate an answer to the query.

* * * * *